(12) United States Patent
Rosin et al.

(10) Patent No.: US 7,032,577 B2
(45) Date of Patent: Apr. 25, 2006

(54) EXHAUST GAS HEAT EXCHANGER

(75) Inventors: Jürgen Rosin, Stuttgart (DE); Bernhard Bronischewski, Krefeld (DE); Ulrich Fassbender, Mönchengladbach (DE); Manfred Heinze, Viersen (DE); Andreas Krien, Bedburg (DE); Markus Wallraven, Neuss (DE)

(73) Assignee: BEHR GmbH & Co. KG, Stuttgart (DE)

( * ) Notice: Subject to any disclaimer, the term of this patent is extended or adjusted under 35 U.S.C. 154(b) by 0 days.

(21) Appl. No.: 10/502,030

(22) PCT Filed: Jan. 22, 2003

(86) PCT No.: PCT/EP03/00606

§ 371 (c)(1),
(2), (4) Date: Oct. 25, 2004

(87) PCT Pub. No.: WO03/062625

PCT Pub. Date: Jul. 31, 2003

(65) Prior Publication Data

US 2005/0039729 A1    Feb. 24, 2005

(30) Foreign Application Priority Data

Jan. 26, 2002    (DE) ................................ 102 03 003

(51) Int. Cl.
*F02M 25/07*    (2006.01)
*F01N 5/02*    (2006.01)
*F28F 27/02*    (2006.01)

(52) U.S. Cl. .................. 123/568.12; 60/320; 165/101; 165/103; 165/172

(58) Field of Classification Search ........... 123/568.11, 123/568.12; 60/605.2, 288, 320, 321; 165/100, 165/101, 103, 172
See application file for complete search history.

(56) References Cited

U.S. PATENT DOCUMENTS

| 3,353,590 | A |   | 11/1967 | Holman |
| 4,993,367 | A |   | 2/1991  | Kehrer |
| 5,617,726 | A | * | 4/1997  | Sheridan et al. ........... 60/605.2 |
| 6,141,961 | A |   | 11/2000 | Rinckel |
| 6,718,956 | B1 |  | 4/2004  | Klipfel et al. |
| 6,807,955 | B1 | * | 10/2004 | Leedham et al. ...... 123/568.12 |

FOREIGN PATENT DOCUMENTS

| DE | 914 450       | 7/1954  |
| DE | 44 30 648 A1  | 3/1996  |
| DE | 296 11 034 U1 | 10/1997 |

(Continued)

*Primary Examiner*—Willis R. Wolfe, Jr.
(74) *Attorney, Agent, or Firm*—Foley & Lardner LLP (57) ABSTRACT

The invention relates to an exhaust gas heat exchanger (2) comprising a bundle of pipes (21) consisting of exhaust gas pipes (22) and a bypass channel (23) in a common housing. The pipe bundle is arranged in a first chamber that is crossflown by a liquid coolant and the bypass channel is arranged in a second, separate chamber. The pipe bundle and the bypass channel lead into a common exhaust gas inlet area and a common exhaust gas outlet area in which an exhaust gas valve actuated by a servo-drive is arranged, said valve guiding the exhaust gas flow through the pipe bundle or the bypass channel. According to the invention, the exhaust gas valve has a movable closing organ that is resistant to bending, said organ being preferably embodied as a pivoting semi-flap (27) that is fixed with a longitudinal side (28) to a drive shaft (30) that is arranged crosswise relative to the exhaust gas flow (A).

21 Claims, 5 Drawing Sheets

FOREIGN PATENT DOCUMENTS

| | | |
|---|---|---|
| DE | 199 62 863 A1 | 6/2001 |
| DE | 100 25 877 A1 | 12/2001 |
| EP | 1 030 050 A1 | 8/2000 |
| EP | 1 277 945 A1 | 1/2003 |
| EP | 0 987 427 B1 | 3/2003 |
| JP | 61-237998 A | 10/1986 |
| JP | 63-88212 A | 4/1988 |
| WO | WO 01/53768 A1 | 7/2001 |

* cited by examiner

EXHAUST GAS HEAT EXCHANGER

The invention relates to an exhaust gas heat exchanger in accordance with the preamble of patent claim 1, as has been disclosed by DE-A 199 62 863 in the name of the present Applicant.

In this known exhaust gas heat exchanger, a bypass passage is integrated together with the exhaust gas heat exchanger in a housing. The actual exhaust gas heat exchanger comprises a bundle of exhaust gas tubes which are rectangular in cross section and are arranged in a heat exchanger housing through which the coolant of the coolant circuit of an internal combustion engine flows. Therefore, the heat of the exhaust gases passes into the coolant circuit of the internal combustion engine via the coolant and therefore also into the heating circuit, in which a radiator through which the coolant flows is arranged. The heating of the coolant circuit by means of the exhaust gas heat also allows the vehicle interior compartment to be heated more quickly. This exhaust gas heat exchanger therefore functions as an additional heating means in the warming-up phase. Should heating of the coolant circuit be undesirable, the exhaust gas stream, in the known exhaust gas heat exchanger, is passed through a bypass passage which is thermally insulated from the exhaust gas tubes and the coolant. Consequently, the exhaust gas stream flowing through the bypass passage releases scarcely any heat to the coolant. The exhaust gas stream is made to pass through the exhaust gas tubes around which the coolant flows or through the insulated bypass passage via an exhaust gas valve which is arranged either in the exhaust gas inlet region or in the exhaust gas outlet region and is actuated by an actuating drive. In the known exhaust gas heat exchanger, the exhaust gas valve is designed as an elastic, flexible diverter member.

Exhaust gas heat exchangers are also used as what are known as exhaust gas coolers in the exhaust gas recirculation system in motor vehicles, in particular those having diesel engines. EP-A 987 427 has disclosed an exhaust gas cooler of this type, installed in an exhaust gas recirculation (EGR) system. This exhaust gas cooler has a heat exchanger with exhaust gas tubes that are U-shaped in form, i.e. the inlet and outlet cross sections for the exhaust gas tubes lie at the same end of the exhaust gas cooler and are separated from one another by a partition. This inlet and outlet end of the exhaust gas cooler is assigned a valve device with a shut-off valve and a bypass passage. This enables the exhaust gas stream either to be passed through the exhaust gas cooler, so that the exhaust gas is cooled by the coolant, or to be blocked from flowing to the exhaust gas cooler, so that the exhaust gas stream is passed through the bypass passage—in this case the exhaust gas is not cooled. The bypass passage forms part of the valve device and not part of the exhaust gas cooler.

It is an object of the present invention to improve an exhaust gas heat exchanger of the type described in the introduction in such a way that simple, operationally reliable switching of the exhaust gas stream between on the one hand the heat transfer part and on the other hand the bypass passage is possible.

For the heat exchanger of the generic type, this object is achieved by the characterizing features of patent claim 1. According to these features, the exhaust gas valve for controlling the exhaust gas stream has a rigid closure member which is matched to the thermal, mechanical and dynamic loads of an exhaust gas heat exchanger.

According to an advantageous refinement of the invention, the closure member is designed as what is described as a half-flap, i.e. a flap which is secured on one longitudinal side, with the pivot pin lying in the center of the cross section of flow and the half-flap in each case closing off and leaving open half the cross section of flow, i.e. either the bypass passage cross section or the heat exchanger cross section. This half-flap is simple to actuate from the outside via a drive shaft and in the closed position bears against the inner wall of the exhaust pipe on the circumferential side. In its closed position, the half-flap advantageously adopts a position running obliquely with respect to the exhaust gas direction of flow and is pressed onto the inner housing wall of the discharge passage by the exhaust gas pressure. This allows a stable closed position to be produced.

According to an advantageous refinement of the invention, a partition is provided between pivot pin and inlet cross section of the exhaust gas heat exchanger, which results in improved sealing with respect to the diverted exhaust gas stream.

According to an advantageous refinement of the invention, the closure member is designed as a pivot flap with an approximately centrally arranged pivot pin. The downstream sealing edge of the pivot flap slides along a sealing surface which is concave or cylindrical in design and is secured upstream of the inlet cross sections of the exhaust gas tube bundle and the bypass passage by means of a partition. On account of the central arrangement of the pivot pin, the actuating forces required to pivot this flap are lower; the pivot flap is pressure-compensated about the axis of rotation, i.e. the static pressure does not produce any rotation of the flap. In an advantageous refinement of this embodiment, the exhaust gas flow passage is widened in the pivot region in such a manner that diverting zones for the exhaust gas are formed. This avoids an excessively high pressure loss. An eccentric arrangement of the pivot pin may also be advantageous: this allows the downstream pivot range of the sealing edge and therefore the size of the sealing surface to be reduced.

According to an advantageous refinement of the invention, the closure member is designed as a pivot flap with closure surfaces arranged approximately at right angles to one another, with the pivot pin being arranged approximately at the intersection point of the closure surfaces. This simple flap geometry enables either the tube bundle or the bypass passage to be closed off by one of the two closure surfaces by means of a pivoting movement of 90°, while the other closure surface is oriented in the direction of flow of the exhaust gas and therefore generates scarcely any resistance. A stable closure position is ensured by the pressure of the exhaust gas stream acting on the closure surface located transversely thereto. This design as an angle flap results in a short overall length.

According to an advantageous refinement of the invention, the closure member is designed as a plate slide which can move transversely with respect to the exhaust gas flow and has a cross-sectional area which is approximately half the total cross section of flow. As a result, in each case half of the cross section can be blocked off by a simple translational movement, which is preferably initiated by means of a vacuum cell. It is advantageous for this plate slide to be accommodated in a sliding manner in lateral guide grooves. This plate slide may be arranged in either the exhaust gas inlet region or the exhaust gas outlet region. This plate slide is particularly simple to drive, since there is no need for linkages or crank elements, as are required for a pivoting motion. This design as a plate slide makes the overall length extremely short.

According to an advantageous configuration of the invention, each of the abovementioned closure members can be driven by means of a vacuum cell which is arranged outside the valve housing and is in widespread use as an actuating drive in particular in motor vehicles. The translational movement of the vacuum cell can be converted into a pivoting movement by means of a simple linkage.

According to an advantageous refinement of the invention, the abovementioned exhaust gas heat exchanger may particularly advantageously be used as an exhaust gas cooler in an exhaust gas recirculation system (EGR system) for motor vehicles, in particular with diesel engines or direct injection spark ignition engines. The use of this exhaust gas heat exchanger with an integrated bypass results in very favorable installation and assembly conditions, since the exhaust gas heat exchanger—partly on account of its rectangular cross section—can be arranged relatively close to the engine block, in a space-saving manner, without the need to produce and fit an additional bypass tube.

Exemplary embodiments of the invention are illustrated in the drawing and described in more detail in the text which follows. In the drawing.

Figure 1:
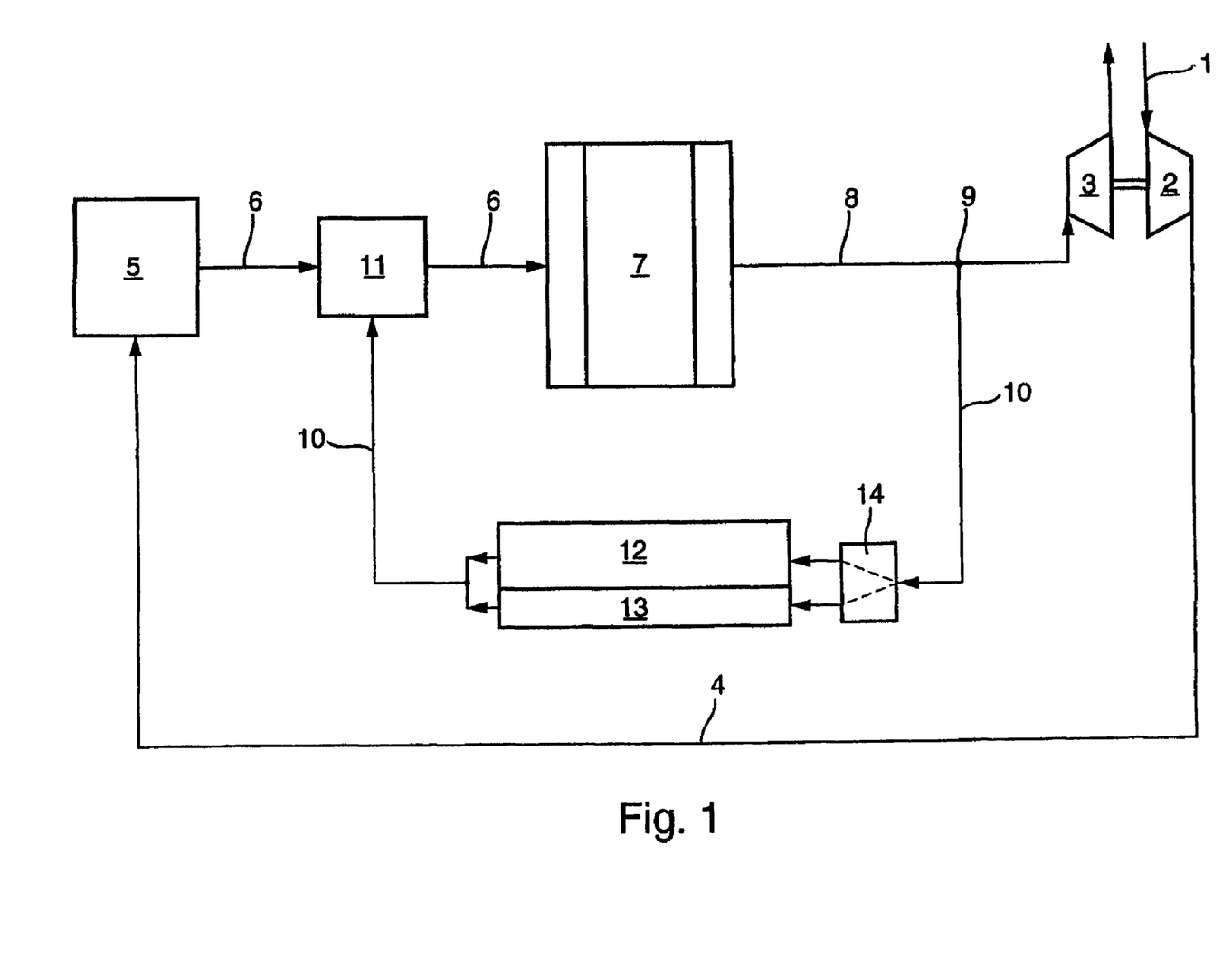
FIG. 1 shows an exhaust gas recirculation system with exhaust gas cooler and integrated bypass.

FIG. 1 diagrammatically depicts an exhaust gas recirculation system (EGR system) having the individual components arranged in the intake air or exhaust gas circuit. The ambient air, represented by an arrow 1, is sucked in via a turbo-compressor 2, which for its part is driven by an exhaust gas turbine 3. The compressed and heated intake air passes via a line 4 into the charge air cooler 5, where it is cooled, and from there via a line 6 to the intake section of a diesel engine or a direct injection spark ignition engine 7. The air which is burnt in the engine emerges via the pipe 8 from the engine 7 into the pipe 8 as exhaust gas via the exhaust section and then passes into the exhaust gas turbine 3 and from there into the open air. In the exhaust section 8, exhaust gas is branched off at a branch point 9 and fed back into the intake air passage 6 in a loop 10 via an exhaust gas recirculation valve 11. The EGR valve 11 controls the quantity of exhaust gas that is recirculated. An exhaust gas cooler 12 with an integrated bypass 13, which has the exhaust gas flowing through it on the primary side and is cooled on the secondary side by the coolant branched off from the coolant circuit (not shown) of the engine 7, is arranged in the loop 10. Upstream of the exhaust gas cooler 12, as seen in the exhaust gas direction of flow, there is an exhaust gas valve 14, which functions as a points system and passes the exhaust gas stream either through the exhaust gas cooler 12 in order to be cooled or through the bypass 13 if cooling of the exhaust gas is not required. This exhaust gas recirculation allows the consumption and emission levels in the engine 7 to be reduced—this exhaust gas recirculation procedure forms part of the known prior art. The following figures describe exemplary embodiments in which the exhaust gas cooler 12, the bypass 13 and the exhaust gas valve 14 are integrated to form a single structural unit.

Figure 2:
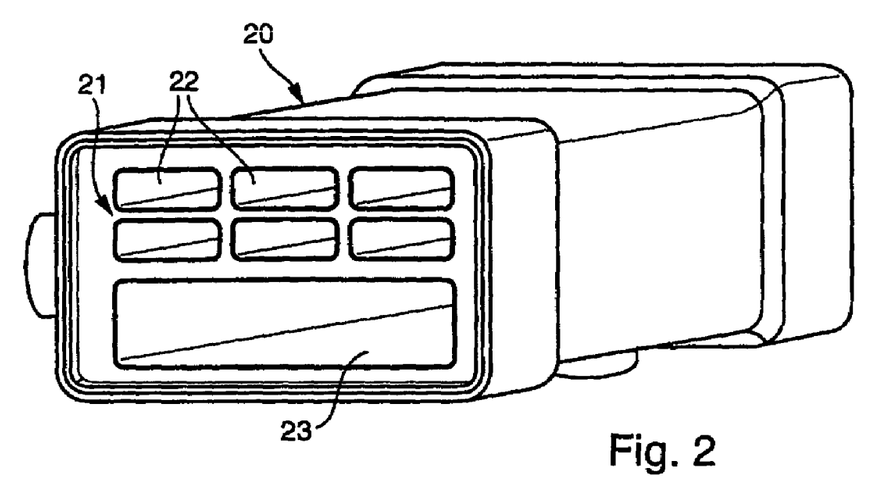
FIG. 2 shows a perspective view of the inlet cross section of the exhaust gas cooler.

FIG. 2 shows a perspective illustration of the inlet cross section of an exhaust gas cooler 20, which includes firstly a tube bundle 21 composed of six exhaust gas tubes 22 which are rectangular in cross section, and secondly a bypass passage 23, with the cross sections of flow of the tube bundle 21 and the bypass passage 23 being approximately identical. As is known per se and consequently not illustrated here, the coolant of the cooling circuit flows around the exhaust gas tubes 22, i.e. the exhaust gas flowing through the exhaust gas tubes 22 dissipates its heat to the coolant in the coolant circuit of the engine.

Figure 3:
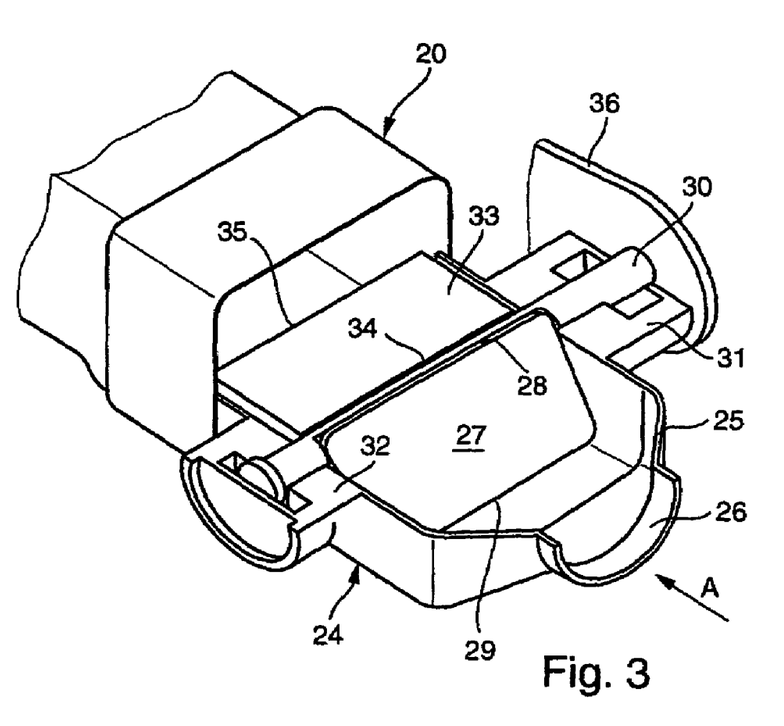
FIG. 3 shows a perspective view of the exhaust gas cooler with exhaust gas valve and half-flap.

FIG. 3 shows the exhaust gas cooler 20 described in FIG. 2, likewise in the form of a perspective illustration, with an upstream exhaust gas valve 24 which has a housing 25 with an inlet connection piece 26 and is welded to the exhaust gas cooler 20. In the interior of the housing 25 there is what is described as a half-flap 27, which is approximately rectangular in cross section, specifically having a longitudinal edge 28 and an outer sealing edge 29. The inner longitudinal edge 28 is secured to a drive shaft 30, which for its part is mounted in a rotatable but axially fixed position in two bearings 31 and 32 located outside the housing 25 and is sealed with respect to the outside. The exhaust gas enters the valve housing 24 through the inlet connection piece 26 in the direction indicated by the arrow A. A partition 33 is arranged beneath the drive shaft 30 in the direction flow; this partition is approximately rectangular in cross section and has an upper longitudinal edge 34 adjoining the drive shaft 30, while a lower longitudinal edge 35 is arranged in a sealing manner between the inlet cross sections, illustrated in FIG. 2 of the tube bundle 21 and the bypass passage 23. The drive shaft 30 and therefore the half-flap 27 are driven by an actuating element, of which in the present figure only an output element in the form of a crank disk 36 is illustrated. In the position of the half-flap 27 illustrated in FIG. 3, therefore, the lower cross section of the exhaust gas cooler, i.e. according to the illustration shown in FIG. 2 the bypass passage 23, is covered, so that the entire exhaust gas stream A flows through the upper cross section of the exhaust gas cooler 20, i.e. through the tube bundle 21. As a result, the exhaust gas is cooled. As can be seen from the illustration presented in FIG. 3, the half-flap 27 is arranged obliquely with respect to the direction of flow of the exhaust gas—this firstly results in a reduced pressure loss for the exhaust gas flow and secondly results in a sufficient pressing action on the half-flap to increase the sealing action.

Figure 4:
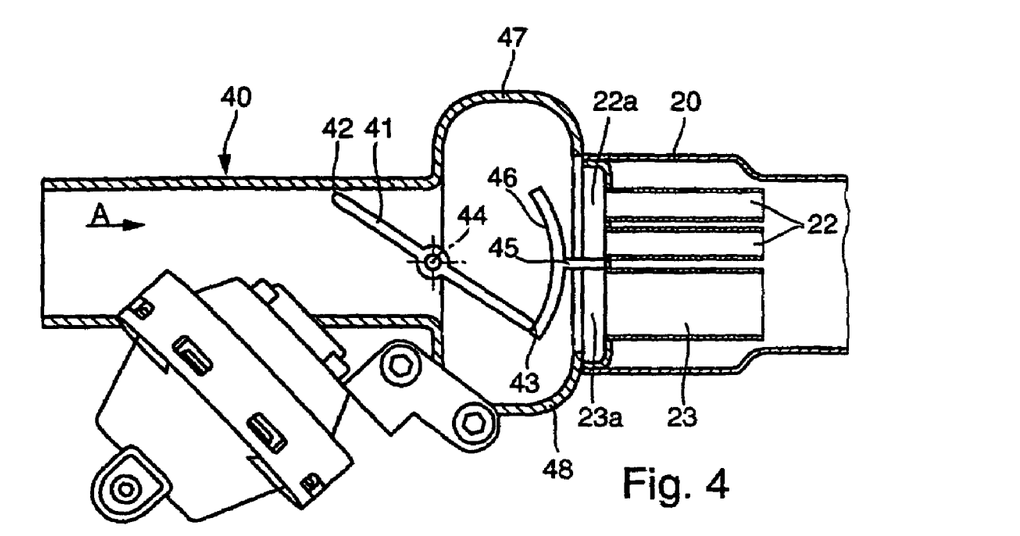
FIG. 4, 4a show a second embodiment of the exhaust gas valve with pivot flap.

FIG. 4 shows a further embodiment of an exhaust gas valve 40, which has a pivot flap 41 with two sealing edges 42 and 43 and a centrally arranged pivot pin 44. This exhaust gas valve 40 is connected upstream of the exhaust gas cooler 20 (same reference numerals as in FIG. 2) comprising the exhaust gas tubes 22 and the bypass passage 23 and is connected to the exhaust gas cooler to form a single structural unit. A partition 45, which at its upstream end has a concave, cylindrical sealing surface 46, is arranged between the inlet cross section 22a for the exhaust gas tubes 22 and the inlet cross section 23a for the bypass passage. This sealing surface 46 interacts with the sealing edge 43 of the pivot flap 41 and, in terms of the length of the arc, extends over the pivot range of the flap 41. On account of this design of the sealing surface 46, the housing of the exhaust gas valve 40 has a widened cross section in this region, with widened sections 47 and 48, so that the exhaust gas stream is provided with a sufficient cross section to pass through and is therefore not subject to an excessively high pressure drop.

As a modification to the illustration presented in FIG. 4, the pivot pin may also be arranged eccentrically, so that the flap part-surfaces are of different sizes on either side of the pivot pin, resulting, with the same pivot angle, in a shorter concave sealing surface the closer the pivot pin moves toward the sealing surface.

Figure 4A:
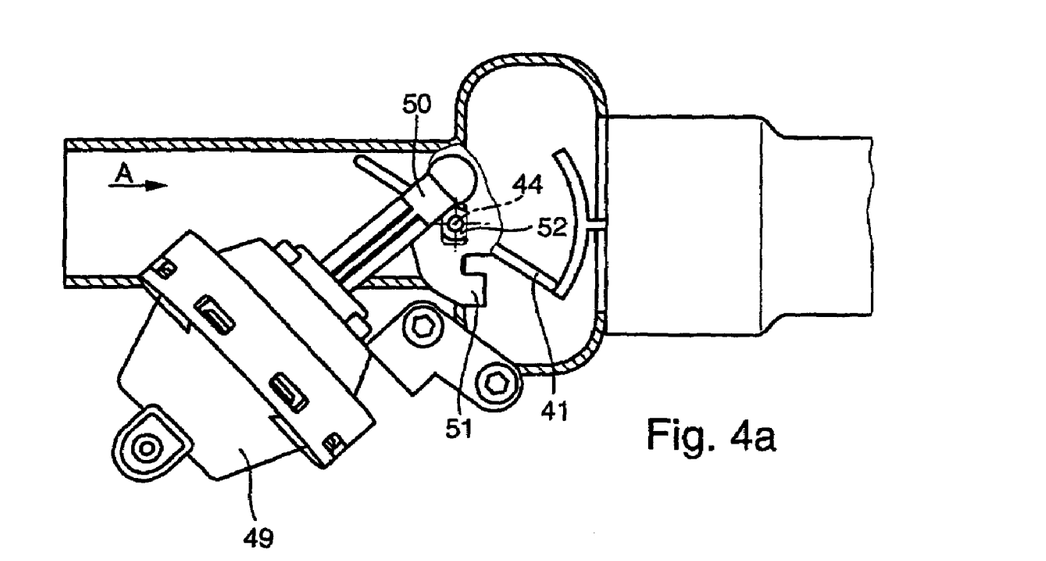

FIG. 4a shows the driving of the pivot flap 41 by means of a vacuum cell 49, the structure and function of which are known per se. This vacuum cell 49 is secured to the outer side of the exhaust gas valve 40 and has a piston rod 50 which is articulatedly coupled to a driver disk 51. The driver disk 51 is secured, in a manner fixed in terms of rotation, to a drive shaft 52 which adjusts the pivot flap 41. In this way, the translational movement of the piston rod 50 and the eccentric articulation by means of the driver disk 51 produce a rotary motion for the pivot flap 41; a pivot range of approximately 60° is sufficient to open up either the upper or the lower cross section of the exhaust gas cooler.

Figure 5:
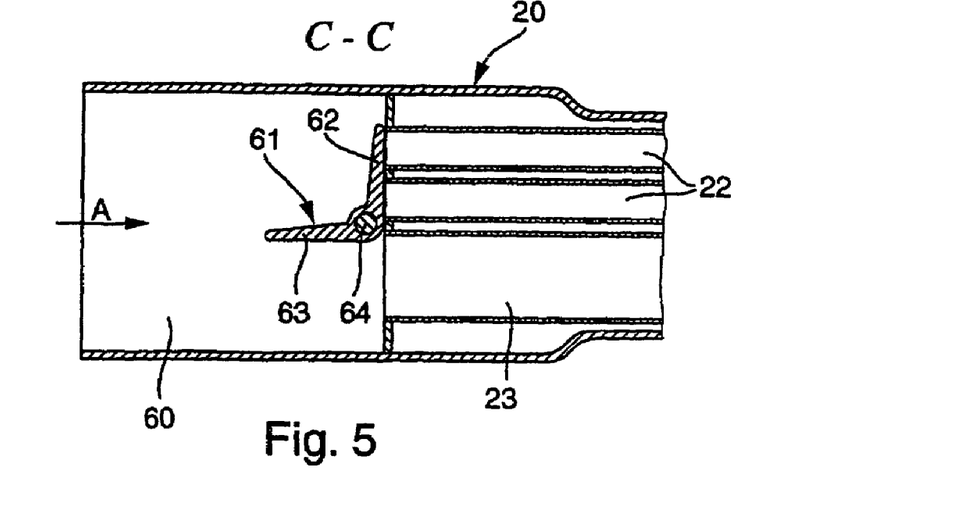
FIG. 5, 5a show a third embodiment of the exhaust gas valve, with angle flap.

FIG. 5 shows a further embodiment with an exhaust gas valve 60 which is connected upstream of the exhaust gas cooler 20 (which once again uses the same reference numerals as above). Immediately upstream of the inlet cross section of the exhaust gas tubes 22 and the bypass passage 23 there is what is known as an angle flap 61, which has two closure surfaces 62 and 63 which are arranged approximately at right angles to one another and the cross sections of which are dimensioned in such a way that they respectively cover the inlet cross section of the exhaust gas tubes 22 or of the bypass passage 23. The angle flap 61 can be pivoted, approximately through 90°, about a pivot pin 64 arranged approximately at the apex of the two closure surfaces 62 and 63. In the pivot position of the flap 61 which is illustrated, therefore, the closure surface 62 is closing off the exhaust gas tubes 22, so that the bypass passage 23 is open; in this position, the second closure surface 63 extends in the direction of the exhaust gas stream A, i.e. it presents only a minimal resistance to the exhaust gas stream, whereas the other closure surface 62 is pressed onto the inlet cross section of the tubes 22 by the exhaust gas stream. This results in a stable closure position.

Figure 5A:
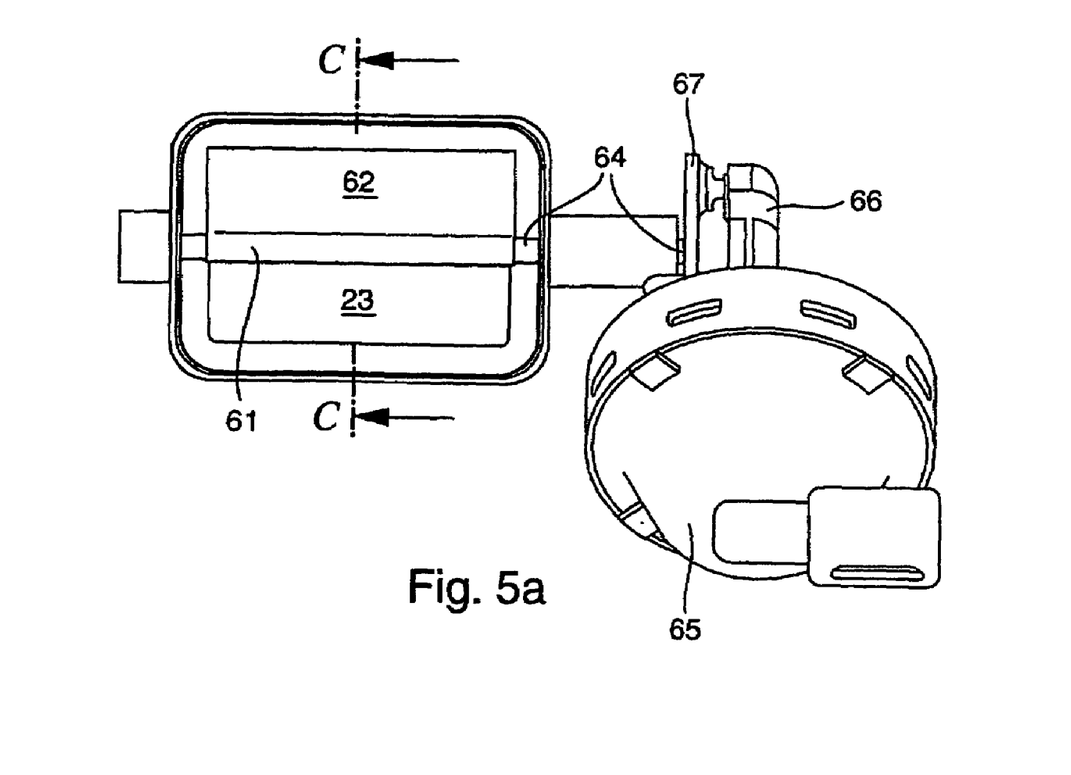

FIG. 5a shows the driving of the angle flap 61, once again produced by means of a vacuum cell 65, which via its piston rod 66 and a driver disk 67 articulatedly connected thereto drives the drive shaft 64, i.e. imparts a pivoting movement of 90° to it.

Figure 6:
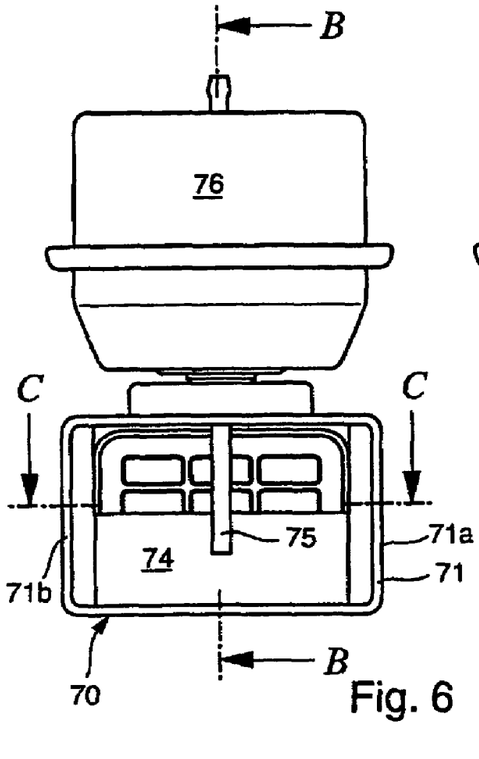
FIG. 6, 6a, 6b show a fourth embodiment of the exhaust gas valve, as a plate slide.
Figure 6A:
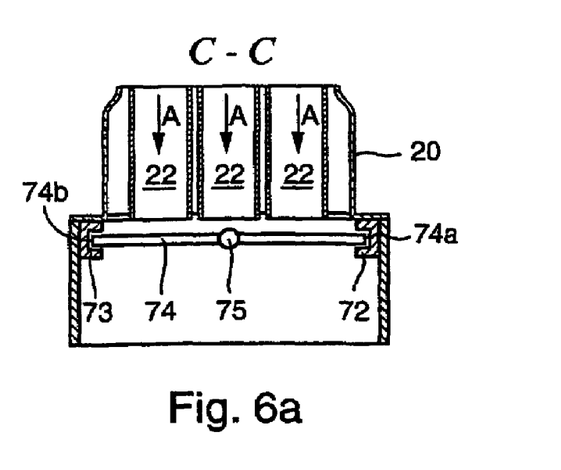
Figure 6B:
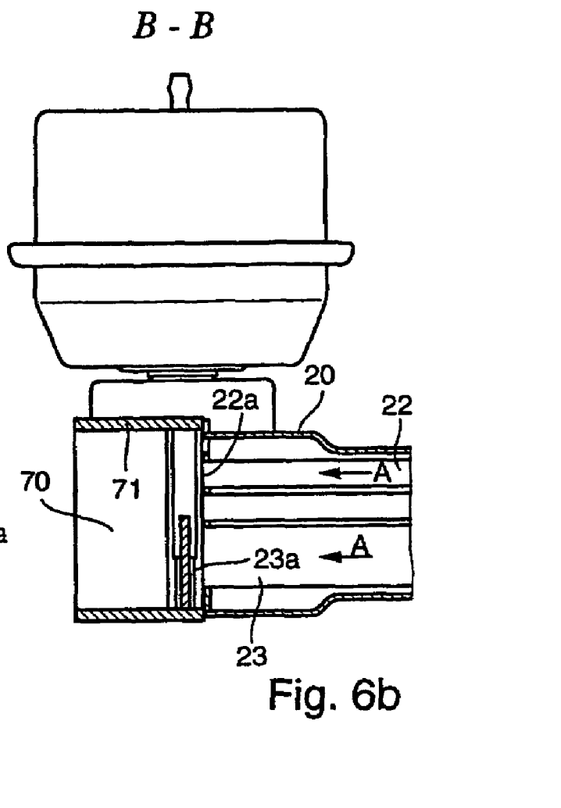

FIG. 6 shows a further exemplary embodiment of an exhaust gas valve 60, which this time is connected downstream of the exhaust gas cooler 20 (for which the same reference numerals are used once again)—the direction of flow of the exhaust gas is indicated by the arrows A. The exhaust gas valve 70 has a housing 71 which is approximately rectangular in cross section, matched to the cross section of the exhaust gas cooler 20. Guide grooves 72 and 73 are secured to the housing 71 on the two narrow sides 71a, 71b of the housing 71; these guide grooves extend over the entire height of the cross section of flow and receive the longitudinal edges 74a, 74b of a plate slide 74, the cross-sectional area of which corresponds to approximately half the cross-sectional area of the valve housing 71 or of the exhaust gas cooler 20. An actuating rod 75, which is connected to the piston of a vacuum cell 76 in a manner not illustrated in more detail, is secured to the plate slide 74. Since the piston (not shown) of the vacuum cell 76 executes a translational movement, in this case there is no need for any transmission means for converting such a movement into a rotary movement, but rather the actuating piston of the vacuum cell is directly coupled to the actuating rod 75 of the slide 64. This results in a particularly simple drive mechanism. In the exemplary embodiment illustrated, the slide 74 is arranged downstream of the exhaust gas cooler 20, although it is also entirely possible for it to be arranged upstream.

The invention claimed is:

1. An exhaust gas heat exchanger comprising:
   a tube bundle composed of exhaust-gas tubes,
   a bypass passage in a common housing, and
   an exhaust gas valve comprising a flexurally rigid, moveable closure member,
   wherein the tube bundle is arranged in a first space, through which liquid coolant flows, and the bypass passage is arranged in a second, separate space,
   wherein the tube bundle and the bypass passage open into a common exhaust gas inlet region and a common exhaust gas outlet region,
   wherein the exhaust gas valve is arranged in the inlet region and is actuated by an actuating drive and guides the flow of exhaust gas through the tube bundle or the bypass passage,
   wherein the closure member is designed as a pivotable half-flap, one longitudinal side of which is secured to a drive shaft arranged transversely with respect to the exhaust gas flow (A), and
   wherein the half-flap is arranged in a valve housing with an approximately rectangular cross section of flow and alternately closes off one half of the cross section or the other half of the cross section.

2. The exhaust gas heat exchanger as claimed in claim 1, wherein a partition is arranged between the drive shaft and the inlet cross sections of the tube bundle and the bypass passage.

3. The exhaust gas heat exchanger as claimed in claim 1, wherein the half-flap closes in the exhaust gas direction of flow (A) and in the closed position is arranged obliquely with respect to the exhaust gas stream (A).

4. The exhaust gas heat exchanger as claimed in claim 1, wherein the actuating drive comprises vacuum cell, an actuating member of which drives the closure member.

5. An exhaust gas recirculation system comprising an exhaust gas heat exchanger according to claim 1.

6. A motor vehicle comprising a heat exchanger according to claim 1.

7. An exhaust gas heat exchanger comprising:
   a tube bundle composed of exhaust-gas tubes,
   a bypass passage in a common housing, and
   an exhaust gas valve comprising a flexurally rigid, moveable closure member,
   wherein the tube bundle is arranged in a first space, through which liquid coolant flows, and the bypass passage is arranged in a second, separate space,
   wherein the tube bundle and the bypass passage open into a common exhaust gas inlet region and a common exhaust gas outlet region,
   wherein the exhaust gas valve is arranged in the inlet region and is actuated by an actuating drive and guides the flow of exhaust gas through the tube bundle or the bypass passage,
   wherein the closure member is designed as a pivot flap with an approximately centrally arranged pivot axle and two opposite sealing edges,
   wherein a partition with a concave sealing surface facing the pivot flap is arranged between the pivot axle and the inlet cross sections of the tube bundle and of the bypass passage, and wherein the downstream sealing edge slides along the sealing surface over the pivoting range.

8. The exhaust gas heat exchanger as claimed in claim 7, wherein the pivot flap is arranged in a housing, the cross section of flow of which widens downstream of the pivot axle, to form flow-diverting regions.

9. The exhaust gas heat exchanger as claimed in claim 7, wherein the actuating drive comprises a vacuum cell, an actuating member of which drives the closure member.

10. An exhaust gas recirculation system comprising an exhaust gas heat exchanger according to claim 7.

11. A motor vehicle comprising a heat exchanger according to claim 7.

12. An exhaust gas heat exchanger comprising:
a tube bundle composed of exhaust-gas tubes,
a bypass passage in a common housing, and
an exhaust gas valve comprising a flexurally rigid, moveable closure member,
wherein the tube bundle is arranged in a first space, through which liquid coolant flows, and the bypass passage is arranged in a second, separate space,
wherein the tube bundle and the bypass passage open into a common exhaust gas inlet region and a common exhaust gas outlet region,
wherein the exhaust gas valve is arranged in the inlet region and is actuated by an actuating drive and guides the flow of exhaust gas through the tube bundle or the bypass passage,
wherein the closure member is designed as an angle flap with two limbs fixedly arranged approximately at right angles to one another and having a common apex, at which the closure member is mounted for rotation about a pivot axle, and
wherein one limb selectively pivots about the pivot axle to respectively cover an inlet cross section of the tube bundle or the bypass passage while the other limb is oriented parallel to the exhaust gas flow (A).

13. The exhaust gas heat exchanger as claimed in claim 12, wherein the actuating drive comprises a vacuum cell, an actuating member of which drives the closure member.

14. An exhaust gas recirculation system comprising an exhaust gas heat exchanger according to claim 12.

15. A motor vehicle comprising a heat exchanger according to claim 12.

16. An exhaust gas heat exchanger comprising:
a tube bundle composed of exhaust-gas tubes,
a bypass passage in a common housing, and
an exhaust gas valve comprising a flexurally rigid, moveable closure member,
wherein the tube bundle is arranged in a first space, through which liquid coolant flows, and the bypass passage is arranged in a second, separate space,
wherein the tube bundle and the bypass passage open into a common exhaust gas inlet region and a common exhaust gas outlet region,
wherein the exhaust gas valve is arranged in the inlet region and is actuated by an actuating drive and guides the flow of exhaust gas through the tube bundle or the bypass passage, wherein the closure member is designed as a plate slide that can move transversely with respect to the exhaust gas direction of flow (A) and has a cross-sectional area which approximately corresponds to half the cross section of flow.

17. The exhaust gas heat exchanger as claimed in claim 16, wherein the plate slide is arranged immediately upstream of the inlet cross sections or downstream of the outlet cross sections of the exhaust gas cooler and has two parallel longitudinal edges which are arranged slideably in housing-side guide grooves.

18. The exhaust gas heat exchanger as claimed in claim 16, wherein an actuating rod which is connected to the actuating drive is secured to the plate slide.

19. The exhaust gas heat exchanger as claimed in claim 16, wherein the actuating drive comprises a vacuum cell, an actuating member of which drives the closure member.

20. An exhaust gas recirculation system comprising an exhaust gas heat exchanger according to claim 16.

21. A motor vehicle comprising a heat exchanger according to claim 16.

* * * * *